United States Patent [19]

Brown

[11] Patent Number: 4,714,023

[45] Date of Patent: Dec. 22, 1987

[54] NON-TOXIC SHOT

[76] Inventor: John E. Brown, 8 Northwood Dr., St. Catharines, Canada

[21] Appl. No.: 844,519

[22] Filed: Mar. 27, 1986

[51] Int. Cl.$^4$ .............................................. F42B 11/04
[52] U.S. Cl. ..................................... 102/516; 102/448; 102/459; 102/501; 420/441
[58] Field of Search ................ 102/448, 459, 514–516, 102/501; 420/441

[56] References Cited

U.S. PATENT DOCUMENTS

| | | | |
|---|---|---|---|
| 204,298 | 5/1878 | Crooke | 102/514 |
| 2,966,427 | 12/1960 | Breining | 420/441 |
| 3,045,334 | 7/1962 | Berzins | 420/441 |
| 3,065,535 | 11/1962 | Crehan et al. | 420/441 |
| 4,397,812 | 8/1983 | Mallory, Jr. | 420/441 |

*Primary Examiner*—Harold J. Tudor
*Attorney, Agent, or Firm*—D. Peter Hochberg

[57] ABSTRACT

A non-toxic wildlife shot pellet for shotgun shells and the like comprises a lead shot pellet having an essentially uniform coating of nickel-phosphorous alloys having a Rockwell hardness of at least 45.

7 Claims, No Drawings

NON-TOXIC SHOT

FIELD OF THE INVENTION

The present invention relates to improved wildlife shot pellets for shotgun shells and other like ammunition.

BACKGROUND OF THE INVENTION

Lead shot conventionally is employed in shotguns. The density of lead provides a ballistic efficiency which has not been matched by any other readily available material, such as steel. Unfortunately, lead presents a serious toxicity problem to waterfowl. Spent shot lying on the bottom of shallow lakes and marshes within reach of feeding ducks and geese is sometimes ingested along with similar sized gravel and taken into the gizzard of the bird. After being broken down in the gizzard, the lead is absorbed into the bird's system, often in lethal doses. Studies have shown that the number of waterfowl which die from lead poisoning have been significant, one 1959 study indicating two to three million deaths in North America. Steps have been taken in some areas of the United States to ban the use of lead shot in favor of steel shot for hunting wildfowl.

Attempts have been made to alleviate this problem, without any significant success. One approach which has been taken is to coat shot in an attempt to isolate the lead from the wildfowl digestive system, but both metallic and non-metallic coatings have been unsuccessful to date. Tin, copper and magnesium coatings were quickly ground off by the abrasive action of the bird's gizzard. Nylon and many similar plastics have a melting point so near to that of lead that coating is impractical. Successfully applied plastic coatings have been found to resist the abrasive action of the gizzard no better than the above-noted metals and, indeed, in the instance of one epoxy resin, hastened the death of ducks. Other forms of coating include nickel coatings as applied to the lead shot. Such nickel coating was applied by electrodeposition techniques to a thickness in the range of 0.001 to 0.003 of an inch. However in tests, inadequate results were realized due primarily to the fact that the nickel coating, as provided by electrodeposition, is of insufficient Rockwell hardness of approximately 35. Hence the nickel coating was ground off in the digestive system of the wildfowl, thereby exposing the lead and causing lead poisoning.

Iron and steel shot are non-toxic but are ballistically inferior to lead and damage shotgun barrels. Steel shot occupies a much greater volume than the same weight of lead shot and fitting a sufficient number of steel shot to provide adequate shot pattern into existing shell cases is a major difficulty. Solid copper shot is ballistically more efficient than iron and does little damage to gun barrels, but is almost as toxic as lead.

SUMMARY OF THE INVENTION

There exists, therefore, a need for a shot material which is non-toxic and yet does not harm gun barrels, especially the full choke variety. It has been surprisingly found that lead shot coated with nickel by the electroless nickel plating technology meets these requirements. In accordance with an aspect of the present invention, there is provided a lead shot pellet comprising lead spheres coated with nickel-phosphorous alloys of a Rockwell hardness in excess of 45.

According to another aspect of the invention, a Rockwell hardness in excess of 60 for the nickel-phosphorous alloy coating can be achieved when the coated lead shot pellets are heat treated at the appropriate temperature for a sufficient duration.

According to another aspect of the invention, a process for producing non-toxic wildlife shot pellets for shotgun shells and the like comprises preparing surfaces of the lead shot pellets to receive a nickel-phosphorous alloy coating. The prepared lead shot pellets are introduced into a electroless nickel plating solution to deposit an essentially uniform coating of nickel-phosphorous alloy by means of auto-catalytic reduction of a source of nickel. The coated lead shot pellets are removed from the electroless nickel plating solution once a desired thickness of nickel-phosphorous alloy is deposited on each of the shot pellets.

According to another aspect of the invention, the process may include heat treating of the nickel-phosphorous alloy coated shot pellets at a temperature less than the melting point of the lead shot pellets and for a duration sufficient to increase a Rockwell hardness rating of the coating to in excess of 60.

DETAILED DESCRIPTION OF THE PREFERRED EMBODIMENTS

According to this invention, the superior ballistic properties of lead are retained for the shot while the nickel-phosphorous coating resists abrasion and degradation in the gizzard of the waterfowl, so that the lead is not broken down in the gizzard, but rather the shot passes harmlessly through the digestive system of the waterfowl and is excreted from the body. A nickel-phosphorous alloy coating, as provided by the electroless nickel plating process, therefore, is successful in alleviating the toxicity problem while other coatings, including prior types of nickel coatings, have not been.

A further significant advantage of the nickel coating is that damage to gun barrels is insignificant even though the nickel-phosphorous coating is a hard metal, thereby enabling a serious defect of iron and steel shot to be overcome. The thin nickel alloy coating permits the shot engaging the gun barrel walls to deform sufficiently to avoid damage to the barrel, in contrast to steel shot which has a considerable peening effect, especially when full choke barrel guns are employed.

Lead shot of conventional manufacture may be plated with the nickel-phosphorous coating by the electroless nickel plating process. The lead shot may be cleaned and prepared in various conventional manners so as to properly receive the nickel-phosphorous alloy coating. According to a preferred embodiment of this invention, the lead shot may be cleaned by known techniques, such as soap cleaning, electro cleaning, ultrasonic cleaning, spray cleaning and acid activation cleaning. Preferably, the lead shot is subjected to an electro cleaning followed by a fluoroboric acid rinse to remove all oxides from the lead shot. In accordance with some uses of the lead shot, the nickel-phosphorous alloy may be deposited directly onto the cleaned lead surface by the electroless process. However according to this preferred embodiment, to ensure a bonding of the nickel-phosphorous alloy coating to the lead, the lead may have one or more intermediary coatings applied thereto. For example, the cleaned lead surface may be flash film coated with a thin layer of copper which may have a thickness in the range of 1/1000 of an inch or less. Such types of copper coating have been routinely applied on lead shot, such as on pellets used in air rifles. In addition to the copper coating, a nickel strike may also be applied to the copper coating in advance of the deposit of the nickel-phosphorous alloy. The nickel strike is a very thin coating of less than 1/1000 of an inch and is deposited by electrodeposition.

The prepared lead shot pellets are then introduced to an electroless nickel plating solution in accordance with the electroless nickel coating technology. The solution comprises a source of nickel ions, a reducing agent for nickel ions, complexing agent for nickel ions, pH regulators and stabilizers and other exultants. Preferably, the source of the nickel ions is a nickel sulfate and the reducing agent is a sodium hypophosphite which supplies the electro chemical energy for the auto-catalytic reduction of nickel. pH regulators include sulfuric acid and ammonium hydroxide to adjust the pH of the bath to the proper level to ensure the correct application of the nickel-phosphorous alloys coating to the prepared lead shot. Buffering agents may be employed to control the pH of the bath within a specified range. In addition to these components in the electroless nickel plating solution, organic chelating agents, such as citric acid, sodium hydroxyacetate and the like may be used to complex the nickel ions. Stabilizers may be used to control the rate of nickel ion reduction from the complex. In addition to stabilizers, accelerators such as alkali fluorides may be used to increase the rate of nickel deposition by activating the hypophosphite anions. Wetting agents may be used to eliminate pitting on the surface of the applied coating and brighteners may be used to provide a deposit brightness to the nickel phosphorous alloy. It is appreciated that the art of electroless nickel plating involving the auto-catalytic reduction of nickel ions by use of a source of phosphites has been widely used in the application of various types of such coatings on steel alloys and aluminum alloys. The components for the nickel plating solution and hardware may be obtained from a variety of sources such as that supplied by M&T Chemicals Inc. of Rahway, New Jersey.

The nickel-phosphorous alloy is deposited on the lead shot pellets in an essentially uniform coating having minimal surface interruptions or porosity. The alloy, as deposited, is in the form of an amorphous alloy with no definable structure. The hardness of the deposited nickel-phosphorous alloy is in the range of 45 to 50 Rockwell and normally about 49. The length of time that the lead shot is left in the nickel plating solution determines the thickness of the deposited nickel-phosphorous alloy coating. According to this invention, the coating should be in excess of 1/1000 of an inch, where is is appreciated that coatings in excess of 4/1000 of an inch are normally excessive. The preferred coating thickness is in the range of 2/1000 of an inch. Hence depending upon the parameters of the process in terms of temperatures, pH, accelerators used, the coated lead shot is removed at the appropriate time to achieve this extent of coating. Furthermore, the make-up of the electro less nickel plating solution is monitered and rejuvenated at the appropriate times to ensure an essentially constant, uniform coating of the lead shot pellets.

One of the advantages in the use of a nickel-phosphorous alloy coating is that the coating may be heat treated to significantly increase its hardness. The so-coated lead shot pellets may be heat treated at temperatures less than the melting temperature of the lead so as to avoid deformation of the shape of the lead shot pellet for a sufficient period of time to increase the Rockwell hardness of the coating to in excess of 60. The range of temperatures which are usable in heat treating the nickel-phosphorous alloy coating may be from 450° F. to 550° F., since these temperatures are below the melting point of lead yet sufficient to cause a conversion of the amorphous nickel-phosphorous alloy into the precipitated forms of specific nickel alloys with phosphorous.

It is possible in heat treating the coating, for example at a temperature in the range of 450° F. for a period extending from approximately 35 to 100 hours, to achieve a coating Rockwell hardness in the range of 65 to 67. Hence the nickel-phosphorous alloy coating of this invention provides a range of Rockwell hardnesses from approximately 45 to to 65. This enables the selection of the desired degree of hardness for the coating depending upon the end use of the coated lead shot pellet.

Tests have shown that the nickel-phosphorous coating for the lead shot at a Rockwell hardness in the range of 50 is not harmful to waterfowl. The coating has a sufficient hardness and abrasion resistance to avoid degradation in the gizzard of the waterfowl so that the lead is not exposed to the digestive system of the waterfowl, which could result in lead poisoning. Depending upon the loadings for the ammunition, it is appreciated that increased Rockwell hardness for the coating may be desired and at these higher ratings for the coating hardness, it has been found that there is no significant effect on poisoning of waterfowl. As the coating is heat treated to achieve the increased Rockwell hardness, the amorphous nickel-phosphorous alloy is precipitated out in the form of $Ni_3P$, $Ni_7P_3$ and $Ni_5P_2$ phases of the nickel-phosphorous alloys which provide for the increased hardness of the coating.

Accordingly, the thickness of the nickel-phosphorous alloy coating applied by this invention is at least sufficient to enable the coating to resist the abrasive and degrative effects of the gizzard of the waterfowl. In addition, the nickel coating is not so thick that the dimensions of the shot are significantly altered and that any significant gun barrel damage occurs in use.

The shot of the present invention, as coated with the nickel-phosphorous alloy at the various degree of hardnesses, is able to deform on impact, but such deformation does not result in the splitting open or flaking off of the nickel-phosphorous alloy coating. Instead, the integrity of the coating is maintained so that lead does not become exposed to waterfowl which may ingest the lead. The lead shot pellets of the present invention may be loaded into conventional types of shotgun shells and the like with or without buffer materials as desired for use. The ballistic characteristics of the shot when fired from such shells are unaffected by the nickel-phosphorous alloy coating.

It has been found that the smoother nickel-phosphorous alloy coating for the lead shot, when loaded with buffering materials, exhibits a superior impact pattern compared to standard lead shot in tests conducted at approximately forty yards distance.

Although preferred embodiments of the invention have been disclosed herein in detail, it will be understood by those skilled in the art that variations may be made thereto without departing from the spirit of the invention or the scope of the appended claims.

I claim:

1. A non-toxic wildlife shot pellet for shotgun shells and the like comprising a lead shot pellet having an essentially uniform coating of nickel-phosphorous alloys having a Rockwell hardness of at least 45, where said coating is applied to said pellet by an electroless nickel-phosphorous alloy coating process.

2. A non-toxic pellet pellet of claim 1, wherein said Rockwell hardness is in excess of 60.

3. A non-toxic pellet of claim 1, wherein said uniform coating of nickel-phosphorous alloy is at least 0.001 of an inch.

4. A non-toxic pellet of claim 1, wherein an intermediate coating of copper is included between said lead shot and said nickel-phosphorous alloy coating.

5. A non-toxic pellet of claim 4, wherein a strike coating of nickel is included between said copper coating and said nickel-phosphorous alloy coating.

6. A non-toxic pellet of claim 2, wherein said nickel-phosphorous alloy comprises alloys of $Ni_3P$, $Ni_7P_3$ and $Ni_5P_2$.

7. A non-toxic pellet of claim 6, wherein said nickel-phosphorous alloy coating is approximately 0.002 of an inch thick.

* * * * *